United States Patent [19]

Hamaguchi et al.

[11] 4,025,890
[45] May 24, 1977

[54] SEMICONDUCTOR PIEZORESISTIVE STRAIN TRANSDUCER

[75] Inventors: Youshi Hamaguchi, Mie; Noboru Yukami, Kawanishi; Tatsuyuki Tomioka, Hirakata; Yoshihito Shimizu, Shijonawate; Hiroyuki Kondo, Neyagawa, all of Japan

[73] Assignee: Matsushita Electric Industrial Co., Ltd., Osaka, Japan

[22] Filed: Feb. 12, 1976

[21] Appl. No.: 657,622

[30] Foreign Application Priority Data

Feb. 18, 1975 Japan ............................... 50-20518

[52] U.S. Cl. .............................. 338/2; 73/88.5 SD
[51] Int. Cl.² .......................................... G01L 1/22
[58] Field of Search ..................... 338/2, 4, 5, 47; 73/88.5 SD; 29/583, 591; 357/26

[56] References Cited

UNITED STATES PATENTS 3,351,880  11/1967  Wilner ........................ 73/88.5 SD Primary Examiner—C. L. Albritton
Attorney, Agent, or Firm—Wenderoth, Lind & Ponack

[57] ABSTRACT

A semiconductor piezoresistive strain transducer having a reduced neck with an hour-glass configuration interconnecting two pads, wherein the reduced neck and the pads have configurations the relation between which prevents corner tips of the pads from coming into contact with a surface of the slender center region of the reduced neck and producing a micro-defect on it, whereby the danger of breaking at the reduced neck is reduced.

2 Claims, 13 Drawing Figures

SEMICONDUCTOR PIEZORESISTIVE STRAIN TRANSDUCER

This invention relates to a semiconductor piezoresistive strain transducer having a reduced neck with an hour-glass configuration interconnecting two pads, and more particularly pertains to such a strain transducer which has a high reliability with respect to breaking strength.

BACKGROUND AND PRIOR ART

FIG. 1 shows a hitherto known strain transducer which is presently in use in phonograph cartridges. Pads 1 on both ends are linked by a reduced neck 2 at the center the reduced neck 2 being formed by recesses 3 in the edges of the pads. The cross-sectional area of the reduced neck 2 is smallest at the center, growing larger in the direction toward the pads 1. As the stress is applied in the direction of axis X—X, the stress is concentrated in the reduced neck; a strain thus develops in the reduced neck 2, causing resistance between the two pads 1 to change due to the piezoresistance effect. According to such a structure, the reduced neck 2 has a high sensitivity.

The reduced neck 2, however, has caused difficulty that variations in the breaking strength thereof are large, that is to say, some of the transducers break easily at the reduced neck. This is the reason why the reliability of the transducer with respect to breaking strength has been low.

OBJECT AND BRIEF SUMMARY OF THE INVENTION

The first object of this invention is to provide a strain transducer having a reduced neck, wherein the likelihood of the transducer breaking at the reduced neck is reduced.

The second object is to provide a strain transducer which performs the first object by adopting modified structure which is easily manufactured. These objects are achieved by a strain transducer according to the present invention having a reduced neck with an hour-glass configuration and two pads interconnected by said reduced neck, said transducer having opposite straight sides with recesses therein defining said reduced neck and said recesses having the general shape of a part of a circle, said pad having ends generally rectangularly shaped with the corner portions having the tips removed, the corner portions of the pads having a shape which, when inscribed in the recess, leaves the corner portions spaced from the reduced neck.

BRIEF DESCRIPTION OF THE DRAWINGS

Other objects and advantageous features of the present invention will become apparent from the following description taken in connection with the accompanying drawings, in which

FIG. 3b is a view showing the relative coplanar positions of two transducers as shown in FIG. 3a;

FIG. 4b is a view showing the relative coplanar positions of two transducers as shown in FIG. 4a;

FIG. 5b is a view showing the relative coplanar positions of two transducers as shown in FIG. 5a;

DETAILED DESCRIPTION

This invention is based on the discovery by the inventors, concerning the breaking of a strain transducer at the reduced neck. According to that discovery, the reduction in the breaking strength which causes such breaking occurs mainly in the washing process, which is a step in the manufacturing of the strain transducers.

Figure 2:
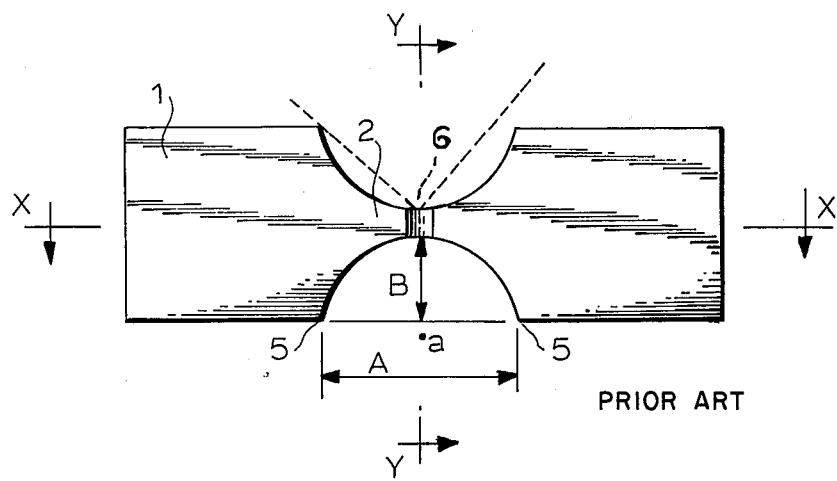
FIG. 2 is a plan view of the strain transducer of FIG. 1.

As shown in FIG. 2, the hitherto known strain transducer has a structure in which the center line of the side surface 4 of the reduced neck 2 has a configuration like an arc. That arc is a part of a circle with its center lying on the line Y—Y which bisects the strain transducer and outside a line connecting the edges 5 of the recess 3. Therefore, when the transducer has dimensions, for example, in which the overall size of the transducer is 2000 $\mu$m × 600 $\mu$m, the width A of the recess 3 at the edges 5 is about 640 $\mu$m and the depth B of the recess 3 is about 270 $\mu$m. Such configuration of the reduced neck 2 has been adopted because it is easy to form.

But when above-mentioned configuration of the reduced neck 2 is adopted, the corner tips 6 of another transducer can easily come in contact with the side surface of the slender center region 7 of reduced neck 2, as shown in FIG. 2 by the dotted line during the manufacturing process. Such contact produces a micro-defect on the semiconductor surface at that part, which defect causes a notable reduction in the breaking strength, namely, the reduced neck 2 becomes easy to break. The above mentioned washing process is as follows;

First, a semiconductor wafer in which a large number of strain transducer elements are formed is stuck by wax on a bed for supporting those elements during their separation from each other by cutting, and then the elements are cut apart with a diamond cutter, wire saw, etc. Thereafter, the now separated elements stuck on the bed and the bed are washed with a detergent to free each element from the bed. In that washing process, each unit wafer or several sheets of wafers as one lot are washed in a glass beaker, for example, as the washing container. The elements will come free as the wax is dissolved by the detergent, and some of the elements may come in contact with one another.

Therefore the production of the micro-defects on the reduced neck as mentioned before occurs with a high probability in the washing process. This is the important cause of the reduction in the reliability of the transducer with respect to breaking strength.

For solving above-mentioned difficulty, the structure of the transducer according to this invention is modified so that no part of a transducer is permitted to come in contact with the slender center region of the reduced neck of another transducer.

To attain the above-described aim, two modifications are possible. One method is to reduce the width A of the recess 3 in FIG. 2 or to increase the depth B of the recess 3, and the other is to alter the corner configuration of the pad 1.

Figure 3A:
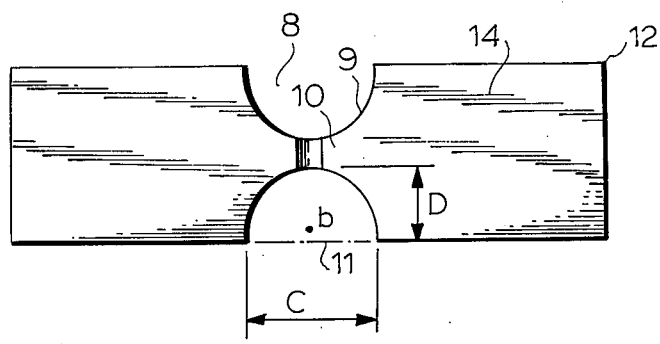
FIG. 3a is a plan view of a strain transducer according to this invention.

A strain transducer embodying this invention which is based on the former modification is shown in FIG. 3a. The transducer of FIG. 3a is identical in its basic rectangular dimensions to the element of FIG. 2; but the width C of the recess 8 in each of the edges is about 440 $\mu$m, the center line of the side surface 9 of the reduced neck 10 is a part of an arc of a circle with a radius of about 220 $\mu$m, and with its center $b$ located inside the line 11 connecting the edge of the recess 8; and the depth D of the recess 8 is about 270 $\mu$m.

Figure 3B:
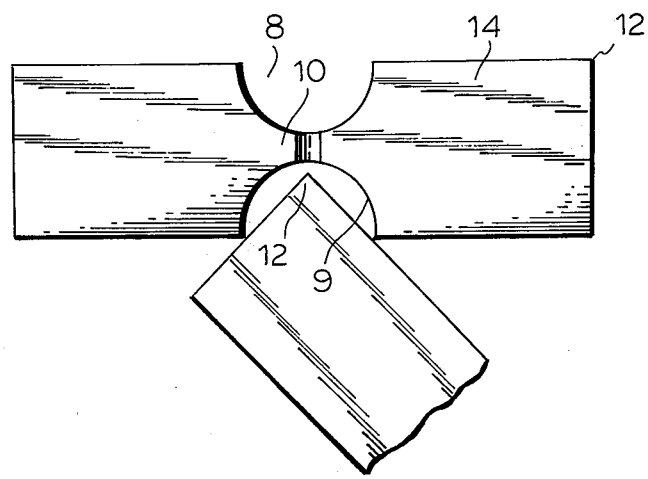

Because the corners 12 of the pads 14 are rectangular and the surface 9 is recessed more deeply than a semicircle at the ends of a diameter of which the two side edges of the recess 8 are located, it will be understood from the theorem of a right angle within the circumference of a circle that corner tips 12 can not come in contact with the surface 9 of the reduced neck 10, as shown in FIG. 3b. Accordingly, if the transducers are not permitted to overlap in the direction of their thickness during washing the reduced neck 10 is protected from the possible infliction of micro-defects. In the washing process, such a condition is obtained by employing a washing apparatus which performs the washing in a space less than twice the thickness of the transducer, as will be described hereinafter.

Figure 4A:
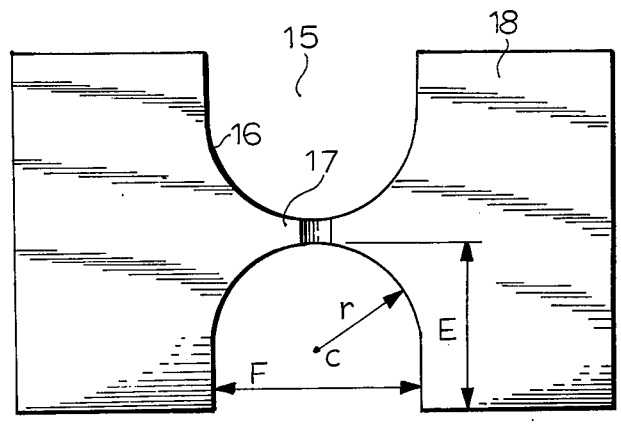
FIG. 4a is a plan view of another strain transducer according to this invention.

FIG. 4a shows a transducer which is another embodiment of this invention, in which the depth E of the recess 15 is simply increased. The depth E of the recess 15 is about 560 $\mu$m; the configuration of the center line of the inner part of the side surface 16 of the reduced neck 17 is a semi-circle with a radius $r$ of about 330 $\mu$m, and with its center C located inside the recess 15; and the width F of the recess 15 is 2$r$.

Figure 4B:
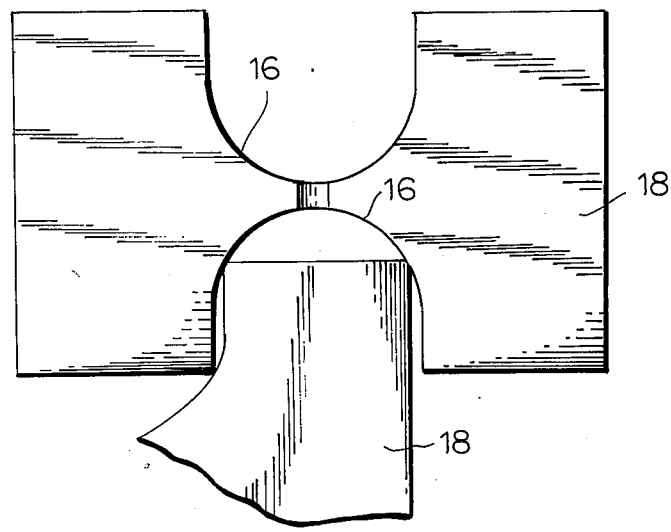

In the transducers with such a configuration, the corner tips of the pads 18 can not come in contact with the reduced neck 17, as shown in FIG. 4b, for the same reason as described in the description regarding FIG. 3.

However, such transducer is larger in size than the transducer of FIG. 3a.

Figure 5A:
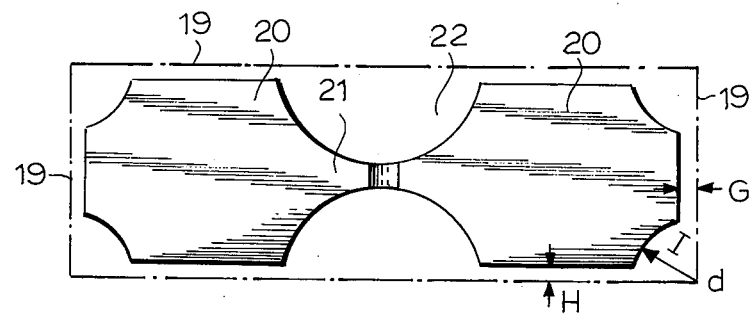
FIG. 5a is a plan view of another strain transducer according to this invention.

Still another embodiment of the transducer is presented in FIG. 5a. In this figure, dot-dash lines 19 indicate the outline of the rectangular transducer of FIG. 2. The transducer of FIG. 5a is obtained by removing the peripheral portion of the transducer of FIG. 2, by the amounts $G = 50$ $\mu$m and $H = 50$ $\mu$m. Further, the corners of the pads 20 are removed to leave a recess having an arc of a circle with a radius $I = 200$ $\mu$m and with its center located at $d$. According to this configuration, due to the removing of the corner tip portion, no part can come in contact with the slender center region of the reduced neck 21 of another transducer.

The dimensions of such removed portion of the corner are determined by considering the relative size of in the reduced neck 21 and the pad 20 of the transducer, which is limited by the contact of the pad 20 with the edges of the recess 22 or the inscribing of the pad 20 in a geometric shape corresponding to the shape of the recess defining the side surface of the reduced neck 21. Further, because the width of the recess 22 is sufficient compared with the depth of the recess as for the transducer of FIG. 2, it is easy to form the reduced neck 21.

The following is a description of the data proving the improved effect according to this invention.

Figure 6:
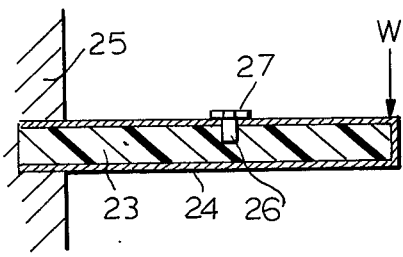
FIG. 6 is a cross-sectional view of equipment for measuring the mechanical strength of the strain transducer.

The breaking strength of the transducers has been measured with the equipment of FIG. 6. Referring to FIG. 6, 23 represents a substrate of glass epoxy, which is coated with a metal film 24 and fixed to a holder 25 as a cantilever. A recess 26 is formed in the upper surface substrate 23. The metal film 24 is cut at the recess 26. A transducer 27 is attached to the substrate 23 in a manner such that it spans the recess 26 and the two pads thereof are positioned on the opposite sides of the recess 26.

At measurement, force W is applied to the free end of the substrate 23 in the direction indicated by the arrow. Thus stress is applied to the transducer 27 through the substrate 23. Breaking of the transducer 27 is detected by observing the electrical resistance between the two pads of the transducer 27 through the metal film 24.

Figure 7:
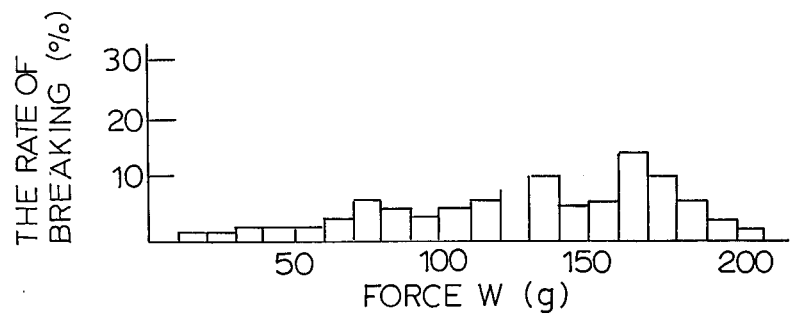
FIG. 7 is a graph of the distribution of the rate of breaking for various intensities of force applied in the equipment of FIG. 6, for the hitherto known strain transducers.
Figure 8:
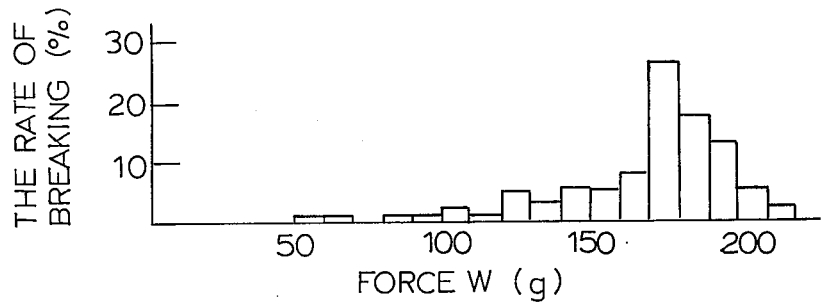
FIG. 8 is a graph of the distribution of the rate of breaking for various intensities of the force applied in the equipment of FIG. 6, for the strain transducers according to this invention.

The data obtained by the above-mentioned equipment are shown in FIGS. 7 and 8 as the proportion of transducers which break for each intensity of the force W. FIG. 7 is the data for hitherto known transducers, and FIG. 8 the data for embodiments according to this invention. Regarding the data of FIG. 7, the mean force is 132g and the standard deviation is 41g. On the other hand, regarding the data of FIG. 8, the mean force is 169g and the standard deviation is 28g. Thus the transducers of the embodiments of this invention have superior breaking strength compared to hitherto known transducers.

Figure 5B:
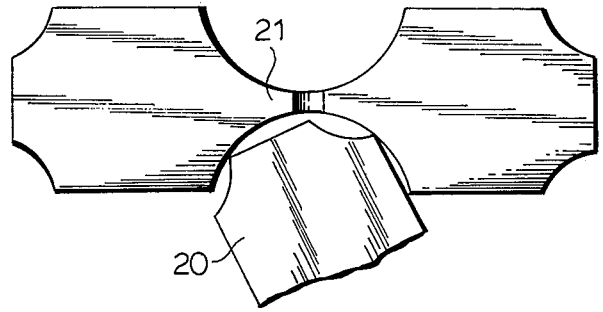
Figure 9:
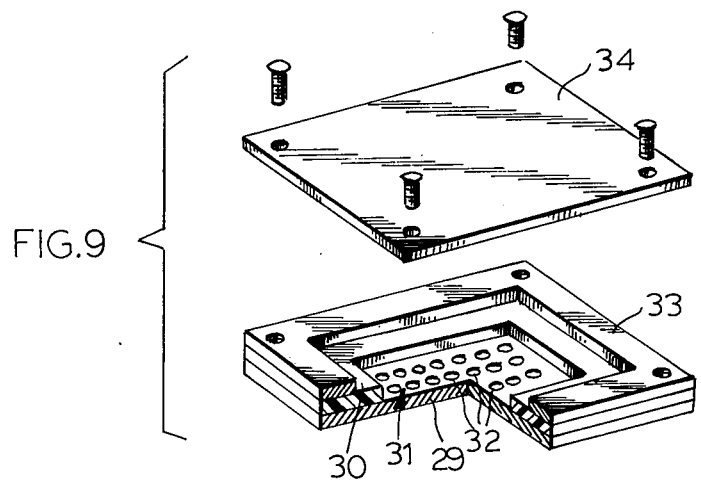
FIG. 9 is an exploded perspective view, partly in cross section of an example of a washing apparatus used in manufacturing of the strain transducers according to this invention.
Figure 10:
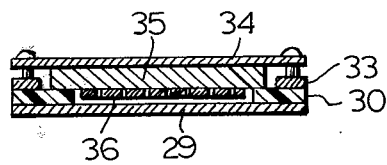
FIG. 10 is a cross sectional elevational view of the assembled washing apparatus of FIG. 9.

In the foregoing embodiments, only the mutual contact of each transducer substantially in the plane parallel to the plane of FIG. 3b, 4b or 5b, is considered. Namely, only the protection of the side surface of the reduced neck is considered. The reason is that the transducers cannot touch the upper or lower surface of another transducer when the washing process is performed by the apparatus as described in the explanation of the foregoing embodiments. An example of such a washing apparatus is shown in FIGS. 9 and 10. Numeral 29 designates a cover plate, and a spacer 30 is mounted on it. The spacer 30 has a central opening 31. At the portion facing the opening 31 of the spacer 29 the cover plate 30 has holes 32 through which detergent passes. The spacer 30 is thicker than the thickness of the transducer and thinner than twice the thickness of the transducers. A frame 33 is mounted on the spacer 30 and the inside configuration thereof is larger than the opening 31 of the spacer 30. Numeral 34 designates a fixing plate for being mounted above the frame 34.

During the washing, a bed 35 with a wafer 36 adhered thereon is placed in the apparatus in such a manner that the bed 35 is supported by the spacer 30 as shown in FIG. 10, and then the fixing plate 34 is attached to the other part, with the bed 35 held between the spacer 30 and the fixing plate 36.

Thus the wafer 36 is confined in the space enclosed by the cover plate 29, spacer 30 and the bed 35. The thickness of this space is defined by the spacer 30, and thus is thinner than twice the thickness of the transducers.

The above described assembly is steeped in detergent and the washing is performed.

Figure 1:
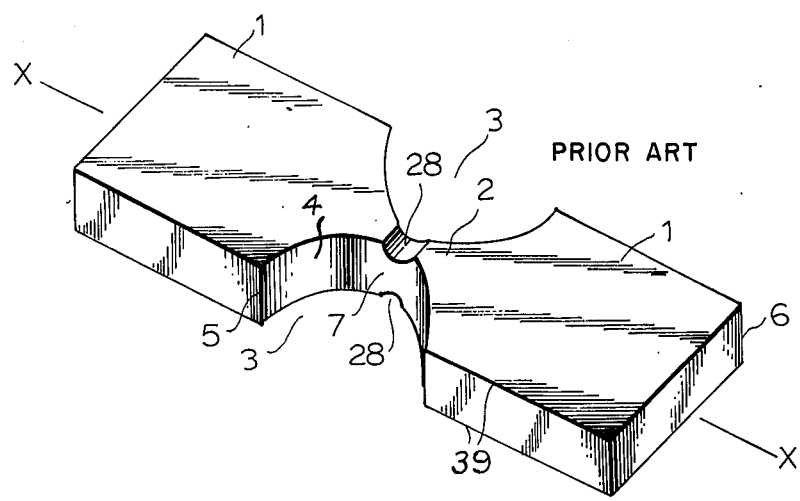
FIG. 1 is a perspective view of a hitherto known strain transducer having a reduced neck with an hour-glass configuration interconnecting two pads.

The protection of the upper or lower surface of the reduced neck can also be achieved in the same manner as described above. That is, in the transducer as shown in FIG. 1, the upper and lower surfaces of the reduced neck 2 are defined by the recesses 28 in the top and bottom surfaces of the transducer. In order that the corner tips of the pads 1 do not come in contact with the surface of the recess 28, the configuration of the recesses 28 is modified as foregoing embodiments, or the upper and lower edges 39 of the pads 1 are removed.

What is claimed is:

1. A semiconductor piezoresistive strain transducer having a reduced neck with an hour-glass configuration and two pads interconnected by said reduced neck, said transducer having opposite straight sides with recesses therein defining said reduced neck and said recesses having a shape which consists of a part of a circle, said pads having ends generally rectangularly shaped with the corner portions having the tips removed, the corner portions of the pads having a shape which, when inscribed in the recess, leaves the corner portions spaced from the reduced neck.

2. A semiconductor piezoresistive strain transduced as claimed in claim 1 wherein said part of a circle is less than a semicircle.

* * * * *